(12) United States Patent
Brandenburg et al.

(10) Patent No.: US 11,850,800 B2
(45) Date of Patent: Dec. 26, 2023

(54) ACCOUNTING FOR INDUCING VARIABLES IN ADDITIVE MANUFACTURING

(71) Applicant: Hamilton Sundstrand Corporation, Charlotte, NC (US)

(72) Inventors: Loren O. Brandenburg, Stafford Springs, CT (US); Vijay Narayan Jagdale, South Windsor, CT (US); Abhay Taneja, Lakeville, CT (US); Alexander Bosworth, Simsbury, CT (US); Sladjan Lazarevic, Simsbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 236 days.

(21) Appl. No.: 17/131,692

(22) Filed: Dec. 22, 2020

(65) Prior Publication Data

US 2022/0194009 A1 Jun. 23, 2022

(51) Int. Cl.
*B29C 64/393* (2017.01)
*B29C 64/245* (2017.01)
(Continued)

(52) U.S. Cl.
CPC .......... *B29C 64/393* (2017.08); *B29C 64/153* (2017.08); *B29C 64/245* (2017.08);
(Continued)

(58) Field of Classification Search
CPC ... B29C 64/393; B29C 64/153; B29C 64/245; B29C 64/268; B29C 64/364;
(Continued)

(56) References Cited

U.S. PATENT DOCUMENTS 10,730,281 B2 8/2020 Mironets et al.
2018/0169757 A1 6/2018 Murao
(Continued)

FOREIGN PATENT DOCUMENTS

EP 3659727 A1 6/2020

OTHER PUBLICATIONS

Extended European Search Report, of the European Patent Office, dated May 23, 2022, in corresponding European Patent Application No. 21217119.3.

(Continued)

*Primary Examiner* — Michael J Brown
(74) *Attorney, Agent, or Firm* — Locke Lord LLP; Daniel J. Fiorello; Gabrielle L. Gelozin

(57) ABSTRACT

A computer-implemented method for additive manufacturing can include receiving, by one or more computing devices, three-dimensional model data, and receiving, by the one or more computing devices, one or more inducing variables. The one or more inducing variables can include at least one of a recoater direction, recoater force, gas flow direction, and/or gas flow rate. The computer-implemented method can also comprise creating a print file as a function of the one or more inducing variables to account for the inducing variables to produce a uniform part throughout a build area or otherwise reduce part variability and outputting the print file to a printer or a data storage device.

16 Claims, 4 Drawing Sheets

(51) Int. Cl.
*B29C 64/364* (2017.01)
*B29C 64/153* (2017.01)
*B29C 64/268* (2017.01)
*B33Y 10/00* (2015.01)
*B22F 10/28* (2021.01)
*B33Y 50/02* (2015.01)

(52) U.S. Cl.
CPC .......... *B29C 64/268* (2017.08); *B29C 64/364* (2017.08); *B33Y 10/00* (2014.12); *B33Y 50/02* (2014.12)

(58) Field of Classification Search
CPC ....... B29C 64/205; B33Y 10/00; B33Y 50/02; G05B 2219/49018; G05B 19/4099; Y02P 10/25; Y02P 90/30; B22F 10/322; B22F 10/366; B22F 10/28; G06Q 50/04
USPC .......................................................... 700/118
See application file for complete search history.

(56) References Cited

U.S. PATENT DOCUMENTS

| | | | |
|---|---|---|---|
| 2018/0349531 A1* | 12/2018 | Morris | G06F 30/15 |
| 2019/0265678 A1 | 8/2019 | Parkes et al. | |
| 2019/0366703 A1* | 12/2019 | Bächer | B33Y 50/02 |
| 2020/0147889 A1 | 5/2020 | Dheeradhada et al. | |
| 2020/0376551 A1 | 12/2020 | Morganson | |

OTHER PUBLICATIONS

Youbus Lee et al., "Effect of Particle Spreading Dynamics on Powder Bed Quality in Metal Additive Manufacturing", Integrating Materials and Manufacturing Innovation, Biomed Central Ltd., London, UK, vol. 9, No. 4, Nov. 19, 2020, pp. 410-422, XP021285771, ISSN:2193-9764, DOI: 10.1007/S40192-020-00193-1.

* cited by examiner

Fig. 2A

| # | | Material | Development | | | | |
|---|---|---|---|---|---|---|---|
| | | 0.5.0 | | | | | |
| # | Tab-1 | General | | | | | |
| # | Sr. No. | Source Index | Layer Thickness | X POSITION | Y POSITION | Layers Count | |
| # | ID. | | 0.03 | | | | |
| | 1 | Part(1) | | -60.252 | -97.196 | 1139 | |
| # | Tab-2 | Strategy | | | | | |
| # | Sr. No. | Source Index | Strategy | Field Size | Field Offset | Minimal Field Size | |
| # | ID. | | | | | | |
| | 1 | Part(1) | STRIPE | 0 | 0 | 0 | |
| # | Tab-3 | Control | | | | | |
| # | Sr. No. | Source Index | Volume Borders | Total Fill | Volume Fill Contours | Volume Hatch | |
| # | ID. | | | | | | |
| | 1 | Part(1) | 1 | 0 | 0 | 1 | |

| | Gas Direction | Gas Flow Rate | Recoater Direction | Recoater Force | | |
|---|---|---|---|---|---|---|
| | ↓211a | ↓211b | ↓211c | ↓211d | | |
| | xxxxx | xxxxx | xxxxx | xxxxx | | |
| Stripe Size | Stripe Offset | Merge Vector Length | Merge Vector | Block Sort | | |
| 5 | -0.06 | 0.5 | 0 | | | |
| Jump Optimization | Upskin | Upskin Border | Downskin | Blocked Path Border | Hatch Compensation | |
| 1 | | 1 | 1 | 0 | 0 | |

209

309

| General | Strategy | Control | Order | Volume | Upskin | Downskin | Scan Volume | Scan Upskin | Scan Downskin | Scan Exposures | | | |
|---|---|---|---|---|---|---|---|---|---|---|---|---|---|
| Part ID | Layer Thickness | X Position | Y Position | Layer Count | Material | | | | | Gas Direction | Gas Flow | Recoater Direction | Recoater Force |
| 1 | 0.03 | -1.204 | 18.587 | 1503 | AlSi10Mg | | | | | XXXXX | XXXXX | XXXXX | XXXXX |
| 2 | 0.03 | -2.077 | 15.883 | 3055 | AlSi10Mg | | | | | XXXXX | XXXXX | XXXXX | XXXXX |
| 3 | 0.03 | -60.252 | -07.156 | 1130 | AlSi10Mg | | | | | XXXXX | XXXXX | XXXXX | XXXXX |
| 4 | 0.03 | 57.227 | -08.552 | 1130 | AlSi10Mg | | | | | XXXXX | XXXXX | XXXXX | XXXXX |
| 5 | 0.03 | -1.914 | -102.74 | 133 | AlSi10Mg | | | | | XXXXX | XXXXX | XXXXX | XXXXX |

311a → Gas Direction
311b → Gas Flow
311c → Recoater Direction
311d → Recoater Force

Fig. 3

ACCOUNTING FOR INDUCING VARIABLES IN ADDITIVE MANUFACTURING

FIELD

This disclosure relates to additive manufacturing, and more particularly to inducing variables in additive manufacturing.

BACKGROUND

Certain slicing software that works with Powder Bed Fusion additive manufacturing machines, for example, contains a vast amount of variables used to control a laser. Parameters, or variables, are generally broken down into categories including strategy, order, volume/bulk, upskin, and downskin, in order to control laser inputs such as power, speed, hatch spacing, laser focus, and offsets. The adjustment of these variables allows for the user to optimize the resulting melt pool characteristics, which yields specific material properties and physical appearances involving, for example, porosity, surface finish, microstructure and properties of the additive component.

Such conventional methods and systems have generally been considered satisfactory for their intended purpose. However, there is still a need in the art for improved methods and systems for accounting for inducing variables. For example, due to the arrangement of a recoater system and gas flow on the powder bed, the local surface finish, porosity, microstructure and property results are not uniform across the build plate. The present disclosure provides a solution for this need.

SUMMARY

A computer-implemented method for additive manufacturing can include receiving, by one or more computing devices, three-dimensional model data, and receiving, by the one or more computing devices, one or more inducing variables. The one or more inducing variables can include at least one of a recoater direction, recoater force, gas flow direction, and/or gas flow rate. The computer-implemented method can also comprise creating a print file as a function of the one or more inducing variables to account for the inducing variables to produce a uniform part throughout a build area or otherwise reduce part variability and outputting the print file to a printer or a data storage device.

In certain embodiments, the one or more inducing variables can be a recoater direction and a recoater force. The one or more inducing variables can alternatively or additionally include a gas flow rate and a gas flow direction.

In certain embodiments, creating the print file can include modifying local effective energy density (e.g., laser power, scan speed, laser spot size, number of points in pulsed or modular laser, distance between points, hatch spacing and offsets) as a function of location on the print bed such that when a location has a higher packing density due to the recoater direction and/or recoater force, a higher energy density is used, and when a location has a lower packing density, lower energy density is used. Modifying local effective energy density can be consistent within an entire predefined zone. In certain embodiments, modifying local effective energy density can be done as a function of x-y position (e.g., for the entire build area) and specific regions of it based on relative relationship of geometry with respect to the recoater direction, recoater force, gas flow direction and gas flow rate.

In certain embodiments, creating the print file can include modifying local effective energy density (e.g., laser power, scan speed, laser spot size, number of points in pulsed or modular laser, distance between points, hatch spacing and offsets) as a function of location on the print bed such that when a location has a higher packing density due to the gas flow direction and/or gas flow rate, a higher energy density is used, and when a location has a lower packing density, lower energy density is used. For example, modifying local effective energy density can be consistent within an entire predefined zone. In certain embodiments, modifying local effective energy density can be done as a function of x-y position (e.g., for the entire build area). The method can include any other suitable method(s) and/or portion(s) thereof.

In accordance with at least one aspect of this disclosure, a computer system for additive manufacturing can include a memory configured to store instructions and a processor disposed in communication with said memory. The processor, upon execution of the instructions, can be configured to perform any suitable embodiment of a method disclosed herein, e.g., as described above.

A method of additive manufacturing can include modifying local effective energy density as a function of location on a print bed as a function of one or more inducing variables. The one or more inducing variables can include at least one of a recoater force, a recoater direction, a gas flow rate, and a gas flow direction. In certain embodiments, the one or more inducing variables can include a recoater direction and a recoater force. In certain embodiments, the one or more inducing variables can include a gas flow rate and a gas flow direction.

In certain embodiments, modifying local effective energy density as a function of location on the print bed can include increasing energy density when a packing density due to the recoater direction and/or recoater force is increased, and reducing energy density when a packing density due to recoater direction and/or recoater force is reduced. Modifying local effective energy density as a function of location on the print bed can include increasing energy density when a packing density due to the gas flow direction and/or gas flow rate is increased, and reducing energy density when a packing density due to gas flow direction and/or gas flow rate is reduced.

In accordance with at least one aspect of this disclosure, a non-transitory computer readable storage medium can include one or more computer programs embedded therein, the computer programs comprising instructions, which when executed by a computer system, cause the computer system to perform any suitable embodiment of a method disclosed herein, e.g., as described above. Any other suitable instructions are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 2A and 2B illustrate an embodiment of a portion of a graphical user interface (GUI) in accordance with this disclosure, showing added input boxes in the GUI to account for inducing variables; and FIG. 3 illustrates an embodiment of a graphical user interface (GUI) in accordance with this disclosure, showing inputs/outputs to account for inducing variables in a plurality of items to be printed.

DETAILED DESCRIPTION

Figure 1:
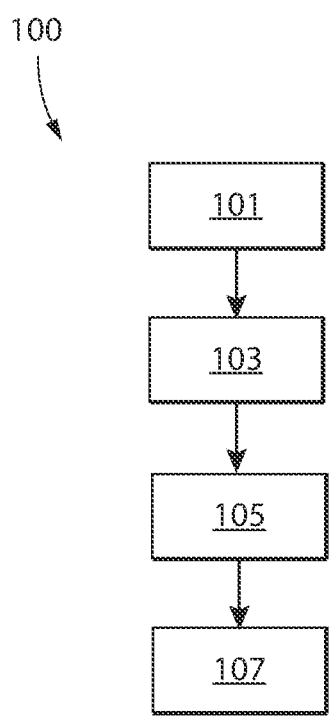
FIG. 1 is a flow diagram of an embodiment of a computer implemented method in accordance with this disclosure.

Reference will now be made to the drawings wherein like reference numerals identify similar structural features or aspects of the subject disclosure. For purposes of explanation and illustration, and not limitation, an illustrative view of an embodiment of a computer-implemented method for additive manufacturing in accordance with the disclosure is shown in FIG. 1 and is designated generally by reference character 100. Other embodiments and/or aspects of this disclosure are shown in FIGS. 2 and 3.

Referring to FIG. 1, a computer-implemented method for additive manufacturing 100 can include receiving 101, by one or more computing devices, three-dimensional model data, and receiving 103, by the one or more computing devices, one or more inducing variables. The one or more inducing variables can include at least one of a recoater direction, recoater force, gas flow direction, and/or gas flow rate. The computer-implemented method can also comprise creating 105 a print file as a function of the one or more inducing variables to account for the inducing variables to produce a uniform part throughout a build area or otherwise reduce part variability and outputting 107 the print file to a printer or a data storage device.

Referring additionally to FIGS. 2A, 2B, and 3, the computer-implemented method for additive manufacturing 100 can include generating a graphical user interface 209, 309 having an input or selector (e.g., input boxes 211a, 211b, 211c, 211d) for the one or more inducing variables and/or an output indication. In certain embodiments, the one or more inducing variables can include a recoater direction and a recoater force. The one or more inducing variables for the computer-implemented method for additive manufacturing 100 can alternatively or additionally include a gas flow rate and a gas flow direction, for example, e.g., as shown in FIGS. 2A, 2B, and 3. For example, as shown in FIGS. 2A and 2B, a portion of an input graphical user interface is shown, indicating input boxes (e.g., boxes 211a, 211b, 211c, 211d shown with representative values "xxxxx") for the one or more inducing variables. The portion of the graphical user interface of FIGS. 2A and 2B can be a spreadsheet type interface as shown, and can be where one or more values are input for one or more (e.g., all) other print variables for a particular part or parts to be built (e.g. part 1 as shown). As shown in FIG. 3, a graphical user interface having data relating to each part to be built is shown, indicating the inducing variables (e.g., in boxes 311a, 311b, 311c, 311d) for each part (e.g., as a function of the x-y position, or manually input for example). FIG. 3 can indicate the "General" tab of the GUI as shown.

In certain embodiments, creating 105 the print file can include modifying local effective energy density (e.g., laser power, scan speed, laser spot size, number of points in pulsed or modular laser, distance between points, hatch spacing and offsets) as a function of location on the print bed such that when a location has a higher packing density due to the recoater direction and/or recoater force, a higher energy density is used, and when a location has a lower packing density, lower energy density is used. Modifying local effective energy density can be consistent within an entire predefined zone. In certain embodiments, modifying local effective energy density can be done as a function of x-y position (e.g., for the entire build area).

In certain embodiments, creating 105 the print file can include modifying local effective energy density (e.g., laser power, scan speed, laser spot size, number of points in pulsed or modular laser, distance between points, hatch spacing and offsets) as a function of location on the print bed such that when there is a higher packing density due to the gas flow direction and/or gas flow rate, a higher energy density is used, and when a location has a lower packing density, lower energy density is used. For example, modifying local effective energy density can be consistent within an entire predefined zone. In certain embodiments, modifying local effective energy density can be done as a function of x-y position (e.g., for the entire build area). The method can include any other suitable method(s) and/or portion(s) thereof.

In accordance with at least one aspect of this disclosure, a computer system for additive manufacturing can include a memory configured to store instructions and a processor disposed in communication with said memory. The processor, upon execution of the instructions, can be configured to perform any suitable embodiment of a method disclosed herein, e.g., as described above.

In accordance with at least one aspect of this disclosure, a method of additive manufacturing can include modifying local effective energy density as a function of location on a print bed as a function of one or more inducing variables. The one or more inducing variables can include at least one of a recoater force, a recoater direction, a gas flow rate, and a gas flow direction. In certain embodiments, the one or more inducing variables can include a recoater direction and a recoater force. In certain embodiments, the one or more inducing variables can include a gas flow rate and a gas flow direction.

In certain embodiments, modifying local effective energy density as a function of location on the print bed can include increasing energy density when a packing density due to the recoater direction and/or recoater force is increased, and reducing energy density when a packing density due to recoater direction and/or recoater force is reduced. Modifying local effective energy density as a function of location on the print bed can include increasing energy density when a packing density due to the gas flow direction and/or gas flow rate is increased, and reducing energy density when a packing density due to gas flow direction and/or gas flow rate is reduced.

In accordance with at least one aspect of this disclosure, a non-transitory computer readable storage medium can include one or more computer programs embedded therein, the computer programs comprising instructions, which when executed by a computer system, cause the computer system to perform any suitable embodiment of a method disclosed herein, e.g., as described above. Any other suitable instructions are contemplated herein.

A slicer, also called slicing software, involves computer software utilized in many three-dimensional printing processes for the conversion of a three-dimensional object model to specific instructions for a printer or data storage device. In particular, as an example, this conversion process can involve the transition from a 3D model format to printer commands (e.g., in g-code format or other suitable format), e.g., for use by a powder bed fusion machine. In certain types of additive manufacturing involving one or more of gas flow or a recoater, the material and/or physical properties of an additively manufactured object(s) can be significantly impacted by one or more inducing variables, including recoater direction, recoater force, gas flow rate, and gas flow direction for example. This can result in a nonuniform response across the part, depending on the orientation and location with respect to gas flow and recoater/part interaction angle. The utilization of the one or more inducing variables additive manufacturing to modify the print file (e.g., the g-code) can allow for the additive manufacturing process to produce a consistent product across the build plate.

The one or more inducing variables can be used to influence other existing parameters, including, but not limited to, power, speed, and offset, in order to provide a more accurate three-dimensional model of the end result. For example, recoater direction and/or force can cause differences in particle size, e.g., from beginning side to end side of recoater motion, or from geometry of part relationship to the powder and how it affects the resulting three-dimensional object. The relative relationship of geometry being built and the recoater direction, recoater force, gas flow direction and gas flow rate, creates higher or lower powder packing density or segregation of larger or smaller powder or spatter particles in the neighborhood of the geometry, resulting in a variation of surface finish, porosity, microstructure and properties. One having ordinary skill in the art in view of this disclosure would understand the relationship between powder packing density (e.g., including particle size variation) and the above disclosed inducing variables (e.g., such that powder packing density is increased closer to a recoater beginning point and/or a gas source).

Using embodiments, consistent results can allow for the ability to print higher precision parts with better quality and material properties. For example, embodiments can allow additive manufacturing of objects with superior surface finish, porosity, microstructure, and tensile and fatigue properties. The inclusion of inducing variables in the additive manufacturing of higher precision parts can reduce the number of iterations and time required to meet the needs for additive parts designs in certain embodiments.

Current software packages do not take into consideration certain inducing variables, e.g., recoater force, gas flow rate, and recoater and gas flow directions, which can be each independent variables, but supplemental to the laser variables previously described. Only allowing for bulk edits of the variables based on bulk, boarder, upskin and downskin greatly reduces the accuracy and precision of the additive part, process, and resulting three-dimensional object.

Typically, recoater direction is fixed, recoater force is fixed (e.g., as a function of recoater mechanism, recoater type, and recoater speed), gas flow direction is fixed and the gas flow velocity or rate is fixed in the machine build settings. If the geometric relationship to the geometry or part shape being built is known, other input variables can be changed (e.g., changing local effective laser energy density through a change in laser power and/or scan speed and/or spot size and/or any other programmable input variables) to make sure build results are uniform all over the build plate. In certain embodiments, recoater force can be changed as a constant value that is then fixed throughout the build. Gas flow rates can be changed throughout the build, as a function of time. In certain embodiments, in the regions of higher packing density, a higher energy density can be used, and for regions of lower packing density, a lower energy density can be used.

Embodiments can be applied to the laser powder bed fusion process or any other suitable powder bed processes, e.g., electron beam melting, laser polymer additive manufacturing. Any suitable powder bed processes using any suitable energy source, e.g., laser, electron beam, and any suitable materials, e.g., metals, polymers, composites, ceramics, are contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A computer-implemented method for additive manufacturing, comprising:
   receiving, by one or more computing devices, three-dimensional model data;
   receiving, by the one or more computing devices, one or more inducing variables, wherein the one or more inducing variables includes at least one of a recoater direction, recoater force, gas flow direction, and/or gas flow rate;
   creating a print file as a function of the one or more inducing variables to account for the inducing variables to produce a uniform part throughout a build area or otherwise reduce part variability; and
   outputting the print file to a printer or a data storage device,
   wherein the one or more inducing variables include a gas flow rate and a gas flow direction.

2. The computer-implemented method of claim 1, wherein the one or more inducing variables include a recoater direction and a recoater force.

3. The computer-implemented method of claim 1, wherein the one or more inducing variables include recoater direction and/or recoater force, wherein creating the print file includes modifying local effective energy density as a function of location on the print bed such that when a location has a higher packing density due to the recoater direction and/or recoater force, a higher energy density is used, and when a location has a lower packing density, lower energy density is used.

4. The computer-implemented method of claim 3, wherein modifying local effective energy density is consistent within an entire predefined zone.

5. The computer-implemented method of claim 3, wherein modifying local effective energy density is done as a function of x-y position.

6. The computer-implemented method of claim 1, wherein the one or more inducing variables include gas flow direction and/or gas flow rate, wherein creating the print file includes modifying local effective energy density as a function of location on the print bed such that when a location has a higher packing density due to the gas flow direction and/or gas flow rate, a higher energy density is used, and when a location has a lower packing density, lower energy density is used.

7. The computer-implemented method of claim 6, wherein the modifying local effective energy density is consistent within an entire predefined zone.

8. The computer-implemented method of claim 6, wherein modifying local effective energy density is done as a function of x-y position.

9. A method of additive manufacturing, comprising:
modifying local effective energy density as a function of location on a print bed as a function of one or more inducing variables, wherein the one or more inducing variables include at least one of a recoater force, a recoater direction, a gas flow rate, and a gas flow direction, wherein the one or more inducing variables include a gas flow rate and a gas flow direction.

10. The method of claim 9, wherein the one or more inducing variables include a recoater direction and a recoater force.

11. The method claim 9, wherein modifying local effective energy density as a function of location on the print bed includes increasing energy density when a packing density due to the recoater direction and/or recoater force is increased, and reducing energy density when a packing density due to recoater direction and/or recoater force is reduced.

12. The method of claim 9, wherein modifying local effective energy density as a function of location on the print bed includes increasing energy density when a packing density due to the gas flow direction and/or gas flow rate is increased, or reducing energy density when a packing density due to gas flow direction and/or gas flow rate is reduced.

13. A non-transitory computer readable storage medium and one or more computer programs embedded therein, the computer programs comprising instructions, which when executed by a computer system, cause the computer system to:
receive three-dimensional model data;
receive one or more inducing variables, wherein the one or more inducing variables includes at least one of a recoater direction, recoater force, gas flow direction, and/or gas flow rate;
create a print file as a function of the one or more inducing variables to account for the inducing variables to produce a uniform part throughout a build area or otherwise reduce part variability; and
output the print file to a printer or a data storage device, wherein the one or more inducing variables include a gas flow rate and a gas flow direction.

14. The computer system of claim 13, wherein the one or more inducing variables include a recoater direction and a recoater force.

15. The computer system of claim 14, wherein creating the print file includes modifying local effective energy density as a function of location on the print bed such that when a location has a higher packing density due to the recoater direction and/or recoater force, a higher energy density is used, and when a location has a lower packing density, lower energy density is used.

16. The computer system of claim 13, wherein creating the print file includes modifying local effective energy density as a function of location on the print bed such that when a location has a higher packing density due to the gas flow direction and/or gas flow rate, a higher energy density is used, and when a location has a lower packing density, lower energy density is used.

\* \* \* \* \*